Figure 1:
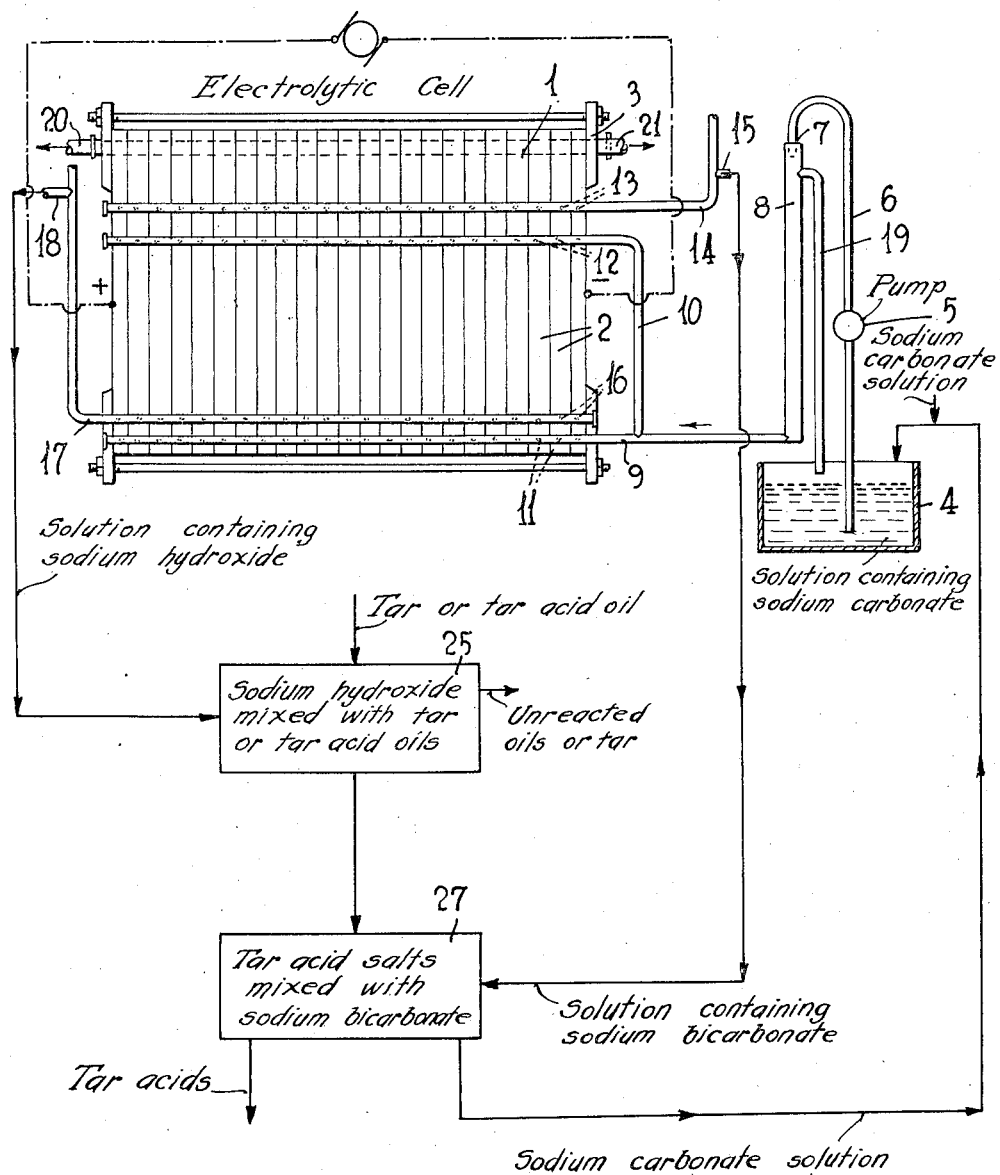

Sept. 12, 1939.   H. L. STEWART   2,172,415
PROCESS OF RECOVERING PHENOLS
Original Filed June 26, 1936    2 Sheets—Sheet 1

Inventor
Hubert L. Stewart
By Frank H. Wisch.
Attorney

Patented Sept. 12, 1939

2,172,415

UNITED STATES PATENT OFFICE 2,172,415

PROCESS OF RECOVERING PHENOLS

Hubert L. Stewart, Pittsburgh, Pa., assignor, by mesne assignments, to Koppers Company, a corporation of Delaware Application June 26, 1936, Serial No. 87,571
Renewed December 2, 1938

4 Claims. (Cl. 204—9)

This invention relates to improvements in methods of producing phenols or so-called tar acids and more particularly to the recovery thereof from oils or tars.

Up to the present time the removal of tar acids from oils and tars has generally been accomplished by means of an aqueous solution of sodium hydroxide to a large extent obtained by causticizing sodium carbonate with calcium hydroxide. In the usual tar acid plant, sodium hydroxide solution is mixed with tar acid oil and the tar acids are extracted in the form of tar acid salts otherwise designated as phenolates or cresylates. The phenolate or cresylate solution is separated from the remaining unreacted, oily constituents of the tar acid oil and is evaporated. The evaporation treatment purifies the cresylate solution by removal of oils, naphthalene, and pyridine. The resulting cresylate solution is treated with a mineral acid or carbon dioxide gas to "spring" the phenols. Free phenols or tar acids, and sodium carbonate solution thus formed in the springing operation are insoluble in each other and are separated by centrifugal means or by decantation. Sodium carbonate is treated as indicated above to convert it into sodium hydroxide which is used for further extraction of tar acids. If a mineral acid neutralization process is employed, the sodium is lost from further usefulness. The free tar acids may be further treated by acidifying, neutralizing, washing, and fractionating to render them suitable for the trade.

The regeneration of sodium hydroxide from sodium carbonate that is generally practiced in tar acid plants increases production costs to such an extent that the elimination of the caustic soda regeneration system has become a matter of considerable importance. As is well known, the sodium carbonate solution obtained in "springing" phenolates, is treated in causticizers with lime coming from lime-kilns used for burning limestone and for generating carbon dioxide. The caustic soda solution from the causticizers must then be filtered to remove calcium carbonate before the solution is employed for extracting tar acids. The equipment, including "springing" tanks, causticizers, kilns, and filter presses, required in plants employing the above prior process, is relatively costly to install and to operate. The existing process is further encumbered by the necessity for reburning or disposing of the calcium carbonate from the causticizers.

In the process of the present invention to be described below, the use of carbon dioxide gas in the treatment of phenolates is avoided and therefore the equipment otherwise necessary is dispensed with. Such apparatus as lime-kilns, causticizers, and coke burners are eliminated. Filter presses for removing calcium carbonate from caustic soda solution are likewise eliminated. The process is so conducted that losses of reagents employed are practically negligible. No problem in waste disposal is involved.

It has been found in the process of the present invention that highly desirable results are obtained by utilizing for phenol extraction the catholyte solution developed in the electrolysis of sodium carbonate solution and utilizing the anolyte solution, thus developed, in decomposing the phenolate formed in the extraction of phenols by means of the catholyte solution. It has been found also that the catholyte solution contains sodium hydroxide and is highly effective in the extraction of phenols while the anolyte solution contains sodium bicarbonate which likewise is highly effective in decomposing phenolates. It has further been found that sodium hydroxide and sodium bicarbonate are generated from a given sodium carbonate solution in equivalent amounts, the proportion of sodium bicarbonate generated in any given period being substantially sufficient to decompose the phenolate formed from sodium hydroxide generated in substantially the same period from the said sodium carbonate.

In the use of the present invention, it is possible to provide a continuous cyclic process in which there is a continuous extraction of tar acids and recovery of free acids by means of products of electrolysis. Sodium carbonate resulting from the treatment of the phenolates or tar acid salts with the anolyte solution is returned for regeneration of the anolyte and catholyte solutions.

Figure 2:
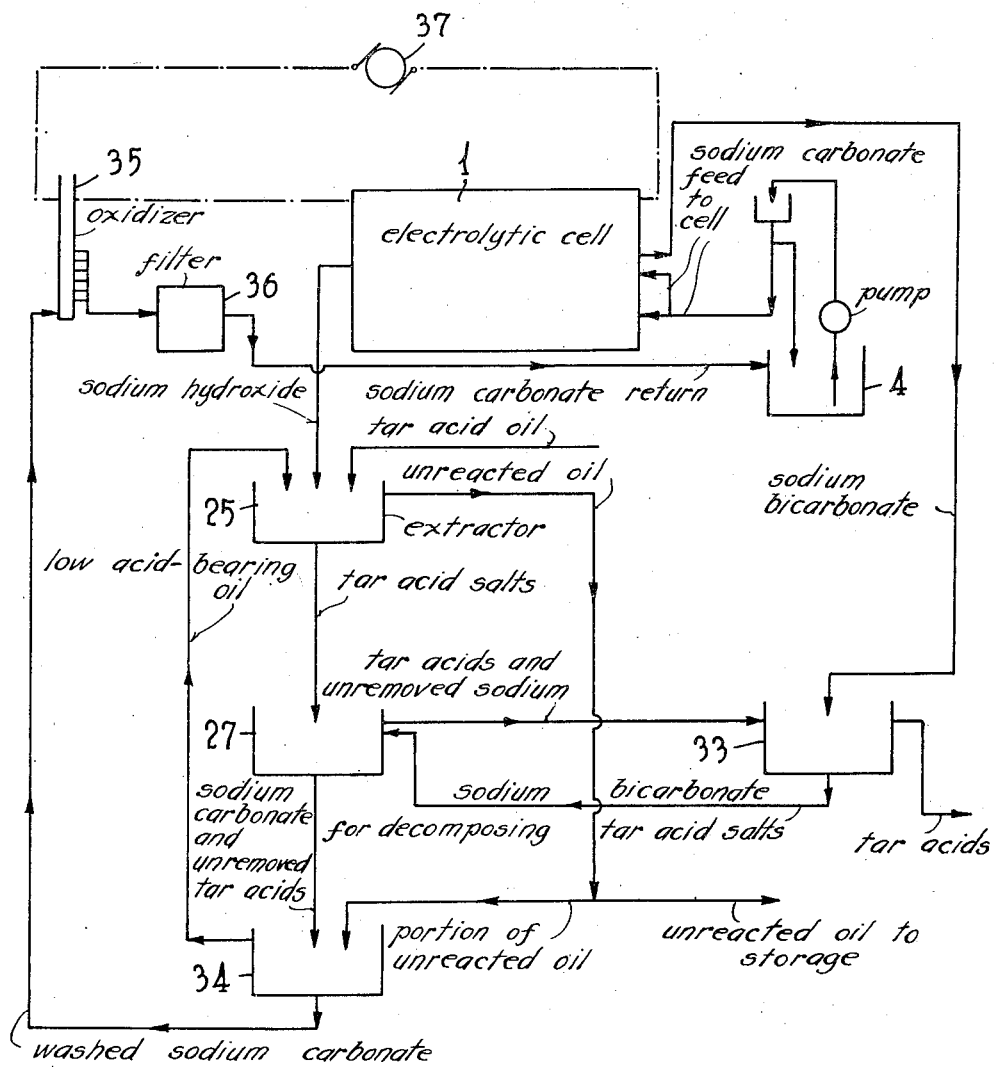

For purposes of illustration, reference is made to the accompanying drawings in which Fig. 1 is partly diagrammatic and partly a side elevation of a portion of the apparatus employed in the process, and Fig. 2 is a diagrammatic illustration of a modified form of the process. Similar reference characters designate similar parts in each of the figures.

The apparatus shown in Fig. 1 includes an electrolytic cell or generator preferably of the type known as a bipolar, multiple-cell generator, or generator of the filter-press type because it resembles a filter-press in appearance. The generator 1 comprises a plurality of iron electrode plates 2 clamped together in a heavy frame 3, electrically insulated from one another and separated by diaphragms of porous fabric (not shown).

Each plate is centrally recessed on both sides, and each pair of plates forms a cell which is divided by a diaphragm. One side of a plate may be nickel-plated to form the anode of a cell and the other side may be iron which forms the cathode of an adjacent cell. These are all well-known standard features and form no part of the present invention.

In electrolyzing sodium carbonate solution, sodium hydroxide is generated at each of the cathodes and sodium bicarbonate is generated at each of the anodes. A solution containing sodium hydroxide and a solution containing sodium bicarbonate are separately withdrawn from each cathode and anode chamber respectively. If desired a generator and a method of operating it may be employed which is similar to the generator and operation set forth in a copending application Serial No. 87,569 filed June 26, 1936.

Sodium carbonate solution containing from about 1.8 lbs. to about 3 lbs. sodium carbonate per gallon of water is charged into the cells from a tank 4. In the case of the arrangement shown in the drawings, sodium carbonate solution is pumped by means of a pump 5 through a pipe 6 into an open end 7 of a vertical pipe 8. From the pipe 8 the solution passes through a pipe 9 and a pipe 10. From the pipe 9 the solution flows into the bottom of the anode chamber of each cell through connections 11. From the pipe 10 the solution flows into an upper zone of the cathode chamber of each cell through connections 12.

Solution containing sodium bicarbonate is withdrawn from an upper zone of the anode chamber of each cell through connections 13 leading to a pipe 14 provided with an overflow connection 15. Solution containing sodium hydroxide is withdrawn from the bottom of the cathode chamber of each cell through connections 16 leading to a pipe 17 provided with an overflow connection 18. The pipe 8 is provided with an overflow connection 19 which returns surplus sodium carbonate solution to the tank 4 thereby maintaining a constant level of electrolyte in the cells.

The arrangement shown for the introduction and withdrawal of liquids to and from the cells, makes it possible to obtain the anolyte solution and the catholyte solution from zones in each cell in which sodium hydroxide and sodium bicarbonate generated are more highly concentrated. Sodium hydroxide solution generated in the cathode chamber of a cell is of greater specific gravity than the sodium carbonate solution being electrolyzed and will therefore settle to the bottom of the cathode chamber from whence it is withdrawn for use. Sodium bicarbonate solution generated in the anode chamber is of less specific gravity than the sodium carbonate solution being electrolyzed and will therefore rise to an upper level in the anode chamber from whence sodium bicarbonate solution is withdrawn.

Gas offtakes 20 and 21 suitably connected to the cathode and anode chambers respectively of each cell provide for removal of hydrogen and oxygen which may be utilized for any desired purpose.

The current density on the plates may range from about 50 amperes to about 125 amperes per square foot. The temperature of the cell may be from about 60° C. to about 80° C. A rate of feed of sodium carbonate solution and the current density are maintained at a ratio that gives maximum yields of the electrolysis products. Good results are obtained by feeding the sodium carbonate solution at the rate of about 1.0 gallon per hour per kilowatt hour to the cathode chamber and about 1.2 gallons per hour per kilowatt hour to the anode chamber.

The catholyte solution containing sodium hydroxide is brought into intimate contact with tar acid-bearing oil in an extraction unit 25 of any suitable well-known construction. The tar acid-bearing oil usually treated in a tar acid plant contains from about 20% to about 40% of tar acids. The catholyte solution from the pipe 18 leading from the generator 1 may contain up to about 15% sodium hydroxide. Control tests may be made from time to time to check the concentration.

The temperature in the extractor 25 is maintained at from about 125° F. to about 175° F. The salts of the tar acids are formed and since they are water-soluble they remain in the aqueous catholyte layer which separates from the unreacted constituents or the so-called neutral oil. The oil is removed from the extractor by decantation or otherwise and the solution of tar acid salts is passed into intimate contact with the anolyte solution from the pipe 15 leading from the generator 1. The anolyte solution containing sodium bicarbonate reacts with the sodium salts of the tar acids and forms sodium carbonate and free tar acids. This reaction may take place, at about the temperature range in the extractor 25, in any suitable vessel 27 as for instance a tank provided with an agitator. Good results are obtained by using the anolyte solution at the temperature at which it comes from the generator 1, for instance, the temperature may be about 60° C. to about 80° C. (140° F. to 176° F.) A satisfactory temperature for decomposing the phenolates is about 140° F. to about 180° F. Temperatures above 80° C. in the generator are generally not satisfactory because of too violent evolution of gases. Temperatures much below 60° C. in the generator result in an undue increase in resistance. It is therefore noted that the desired cell temperatures match favorably with the desired temperatures employed in decomposing the phenolates.

In bringing together the tar acid salts and the anolyte solution, the sodium bicarbonate in the latter will react with any excess sodium hydroxide that may be present in the tar acid salt solution and form sodium carbonate. The tar acids freed in the vessel 27 rise to the top and may be removed by decantation, or they may be separated by centrifuging. The sodium carbonate solution is returned to the tank 4 for reuse in the cycle.

In a continuous operation of the above process, sodium carbonate solution is continuously fed to the cell 1, while the anolyte and catholyte solutions are each continuously withdrawn from the cell. In such operation the extractor 25 and the unit 27 are likewise continuously operated. Phenol-bearing material is, in this case, continuously fed to the extractor or mixing chamber 25 and the phenolates withdrawn therefrom are continuously fed to the mixing chamber 27 in which the tar acids are freed.

The process of the present invention may be improved by including, if desired, any one or more of the steps added in Fig. 2 and that are not shown in Fig. 1. Sodium hydroxide solution from the electrolytic cell 1 in which sodium carbonate is electrolyzed, is intimately contacted with tar acid-bearing oil or tar in a vessel 25. The tar acids in the oil or tar are converted into tar-acid salts which are separated from unreacted oily materials. The separated tar-acid salts are passed to a vessel 27 wherein they are intimately mixed together with anolyte solution from the cell 1 which solution contains sodium bicarbonate. Tar acids are freed by this treatment and are separated from sodium carbonate solution formed thereby. Prior to treatment of the tar acid salts with the anolyte solution, the latter may first be used in a vessel 33 to treat previously separated tar acids from the vessel 27 in order to remove sodium that may still be present as phenolate in the tar acids. The resulting free tar acids are removed from the vessel 33 for further treatment or to be sold as such to the trade.

Sodium carbonate formed in the vessel 27 is passed into a vessel 34 and is mixed with about ten percent of the unreacted oils from the vessel 25. This is done to remove as much as possible of the tar acid material that may in certain cases still be present in the sodium carbonate solution when it reaches the vessel 34. The low acid-bearing oils thereby obtained are introduced into the vessel 25 to recover tar acids therefrom.

If the sodium carbonate solution removed from the vessel 34 still contains tar acids, the precaution may be taken to further remove such acids before returning the carbonate solution to the cell 1. It has been found advantageous to remove substantially all contaminating material including even traces of tar acids from the sodium carbonate solution because in the electrolysis of such tar acid-containing solutions over extended periods, accumulation of resinous material results which is difficult to remove from the cell. A highly effective means of removing tar acid material from the sodium carbonate solution is to electrolyze it in an electrolytic oxidizer 35 which may be installed in circuit with the generator 37 that supplies current to the cell 1. The oxidizer 35, of well-known construction, comprises a narrow tank of small width as for instance about ¼ to ⅜ of an inch. The larger opposing side walls of the tank are metal plates insulated from each other, and constitute the positive and negative electrodes. The sodium carbonate solution is passed into the tank 35 at one end near the bottom and is withdrawn at the other end through apertures at any desired level. Any acids present in the carbonate solution are thereby readily oxidized and the resulting oxidation products may be easily separated from the carbonate solution by means of a filter 36. The resulting purified sodium carbonate solution is then introduced into the cell 1 in the manner set forth above.

Any losses of recirculating reagents may be replenished by introducing fresh bicarbonate solution into the vessel 27 or by introducing fresh sodium carbonate solution into the tank 4.

Although tar acids are chiefly obtained from coal tar from low or high temperature carbonization processes, considerable quantities are recovered in the treatment of petroleum oils including lubricating oils. The present process is applicable to the treatment of all of these hydrocarbonaceous materials.

If desired the phenolate solution produced by the reaction of the catholyte solution with phenolic material in the oil or tar, may be allowed to settle in a separate vessel before treating with the anolyte solution. The phenolate material may also be evaporated before further treatment.

A plant including apparatus for conducting the process of the present invention is compact and occupies much less space than the type of plant now in general use and has a greater capacity. The operation of the improved process is clean and eliminates objectionable collection of sludges and dust.

Borax or sodium tetraborate solution may be electrolyzed to produce sodium hydroxide and boric acid. The sodium hydroxide may be used in extracting phenols and to form phenolates. The boric acid may be employed in decomposing the phenolates to produce free phenols. Potassium carbonate solution may be electrolyzed to produce potassium hydroxide and potassium bicarbonate which may be used for the purpose set forth in connection with the corresponding sodium compounds. Although sodium carbonate solution is preferred, it may be substituted by a solution containing a compound which when electrolyzed forms a substance that reacts with free phenolic material to form a phenolate. The compound when electrolyzed should also form a substance that decomposes the phenolate to form both free phenolic material and the original compound that is electrolyzed.

In the description of the present invention, the term "phenol" is used in its broad sense as distinguished from benzophenol (carbolic acid, $C_6H_5OH$), and includes hydroxylated benzenoid substance in general. "Phenolate" is used to designate salts of the so-called phenols or phenols combined with the positive radical of a base. Besides benzophenol specifically, there are, for instance, the cresols, xylols, naphthols and various substituted phenols.

Reference is made herein to copending application Serial No. 251,412, filed January 17, 1939. This application includes a description of and claims for a process of electrolyzing sodium carbonate solution to prepare sodium hydroxide and sodium bicarbonate.

What I claim is:

1. A cyclic process for producing tar acids or phenol from tar oil or phenol-bearing material which comprises electrolyzing a sodium carbonate solution in a cell containing anolyte and catholyte compartments to produce sodium hydroxide in the catholyte compartment and sodium bicarbonate in the anolyte compartment, withdrawing the sodium hydroxide so produced continuously from the catholyte compartment, treating the tar oil or phenol-bearing material with the amount of sodium hydroxide so withdrawn to produce tar acid salts or phenolates, withdrawing the sodium bicarbonate produced in the anolyte compartment continuously from the cell and in amount equivalent to the sodium hydroxide withdrawn from the catholyte compartment, treating the tar acid salts or phenolates produced as above set forth with the sodium bicarbonate so withdrawn to produce free tar acids or phenol and sodium carbonate solution, separating and recovering the free tar acids or phenol and returning the sodium carbonate solution to the cell for further regeneration of anolyte and catholyte solutions.

2. A cyclic process for producing tar acids or phenol from tar oil or phenol-bearing material which comprises electrolyzing an alkali metal carbonate solution in a cell containing anolyte and catholyte compartments to produce alkali metal hydroxide in the catholyte compartment and alkali metal bicarbonate in the anolyte compartment, withdrawing the alkali metal hydroxide so produced continuously from the catholyte compartment, treating the tar oil or phenol-bearing material with the amount of alkali metal hydroxide so withdrawn to produce tar acid salts or phenolates, withdrawing the alkali metal bicarbonate produced in the anolyte compartment continuously from the cell and in amount equivalent to the alkali metal hydroxide withdrawn from the catholyte compartment, treating the tar acid salts or phenolates produced as above set forth with the alkali metal bicarbonate so withdrawn to produce free tar acids or phenol and alkali metal carbonate solution, separating and recovering the free tar acids or phenol and returning the alkali metal carbonate solution to the cell for further regeneration of anolyte and catholyte solutions.

3. A cyclic process for producing tar acids or phenol from tar oil or phenol-bearing material which comprises electrolyzing an alkali metal carbonate solution in a cell containing anolyte and catholyte compartments to produce alkali metal hydroxide in the catholyte compartment and alkali metal bicarbonate in the anolyte compartment, withdrawing the alkali metal hydroxide so produced continuously from the catholyte compartment, treating the tar oil or phenol-bearing material with the amount of alkali metal hydroxide so withdrawn to produce tar acid salts or phenolates, withdawing the alkali metal bicarbonate produced in the anolyte compartment continuously from the cell and in amount equivalent to the alkali metal hydroxide withdrawn from the catholyte compartment, treating the tar acid salts or phenolates produced as above set forth with the alkali metal bicarbonate so withdrawn to produce free tar acids or phenol and alkali metal carbonate solution, separating and recovering the free tar acids or phenol and after treating the alkali metal carbonate solution to remove therefrom substantially all contaminating material including phenolic material returning the alkali metal carbonate solution to the cell for further regeneration of anolyte and catholyte solutions.

4. A cyclic process for producing tar acids or phenol from tar oil or phenol-bearing material which comprises electrolyzing an alkali carbonate solution in a cell containing anolyte and catholyte compartments to produce alkali hydroxide in the catholyte compartment and alkali bicarbonate in the anolyte compartment, withdrawing the alkali hydroxide so produced in the catholyte compartment, continuously feeding tar oil or phenol-bearing material to a mixing chamber, adding thereto the amount of alkali hydroxide so withdrawn to extract tar acids or phenol as tar acid salts or phenolates, withdrawing from the cell during the electrolysis of the carbonate solution, the alkali bicarbonate produced in the anolyte compartment in amount equivalent to the alkali hydroxide withdrawn from the catholyte compartment, continuously feeding the tar acid salts or phenolate produced as above set forth to another mixing chamber, adding thereto the alkali bicarbonate so withdrawn to produce free tar acids or phenol and alkali carbonate solution, separating and recovering the free tar acids or phenol, and returning the alkali carbonate solution to the cell for further regeneration of anolyte and catholyte solutions.

HUBERT L. STEWART.